United States Patent [19]

Child, Jr. et al.

[11] 4,179,227

[45] Dec. 18, 1979

[54] DYNAMIC PLOW ASSEMBLY AND METHOD OF OPERATING SAME

[75] Inventors: James L. Child, Jr.; James L. Fouss; Erwin K. Nowicki, all of Findlay, Ohio

[73] Assignee: Hancor, Inc., Findlay, Ohio

[21] Appl. No.: 825,192

[22] Filed: Aug. 17, 1977

[51] Int. Cl.² .............................. F16L 1/00; E02F 5/10
[52] U.S. Cl. ...................................... 405/182; 405/174; 405/180; 37/DIG. 18; 172/40
[58] Field of Search ...................... 61/72.6, 72.4, 72.5; 37/DIG. 18, 193; 172/40

[56] References Cited

U.S. PATENT DOCUMENTS

| | | | |
|---|---|---|---|
| 3,145,488 | 8/1964 | French | 37/DIG. 18 |
| 3,538,986 | 11/1970 | Stoffel | 172/40 |
| 3,575,006 | 4/1971 | Rugroden | 172/40 X |
| 3,706,207 | 12/1972 | Cornelius et al. | 172/40 X |

FOREIGN PATENT DOCUMENTS

| | | | |
|---|---|---|---|
| 971580 | 7/1975 | Canada | 172/40 |
| 1918670 | 10/1971 | Fed. Rep. of Germany | 172/40 |
| 2607363 | 10/1976 | Fed. Rep. of Germany | 172/40 |
| 25566 | 2/1915 | Norway | 37/DIG. 18 |

*Primary Examiner*—Dennis L. Taylor
*Attorney, Agent, or Firm*—Fay & Sharpe

[57] ABSTRACT

A plow assembly and method useful for burying an elongated flexible member at a predetermined depth beneath ground level. The arrangement utilizes a frame assembly adapted to be pulled by a tractor type vehicle and which frame assembly has a vertically-extending plow support unit. A dynamic plow unit is mounted at the lower end of the plow support unit and includes a generally horizontal base. The forward end of the plow unit includes a plow nose portion having an inclined top surface. The top of the plow unit is defined by a plate member having an upper surface which extends rearwardly from the nose generally parallel to the base. The plate member is mounted about a transverse axis closely adjacent the nose portion for pivotal oscillating movement by hydraulic cylinder means. Such oscillation is between a first position generally parallel to the plow unit base and a second position spaced angularly upward therefrom. Plate member oscillation generally ranges from 20 to 120 cycles per minute with the upward portion of each oscillation being slower than the downward or return portion. The plow nose portion may include a vibrator or a lubricant release for reducing sliding friction. For operating at increased depths a pair of in line, cooperating frame assemblies which are horizontally and vertically spaced apart from each other may be employed.

42 Claims, 14 Drawing Figures

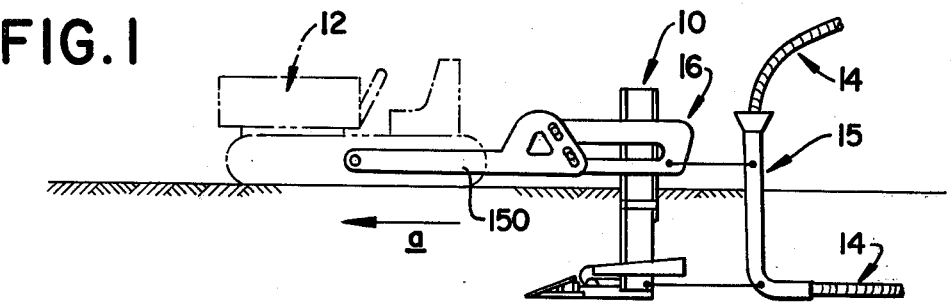
FIG. 1
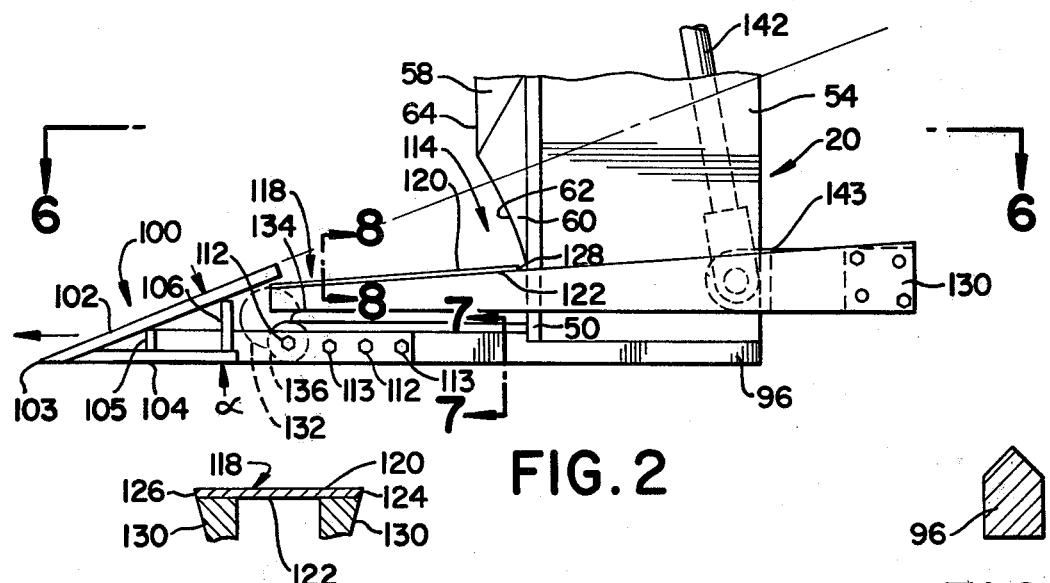
FIG. 2
FIG. 8
FIG. 7
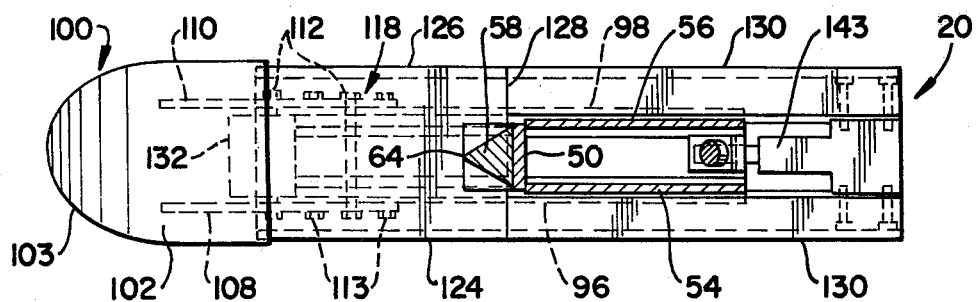
FIG. 6

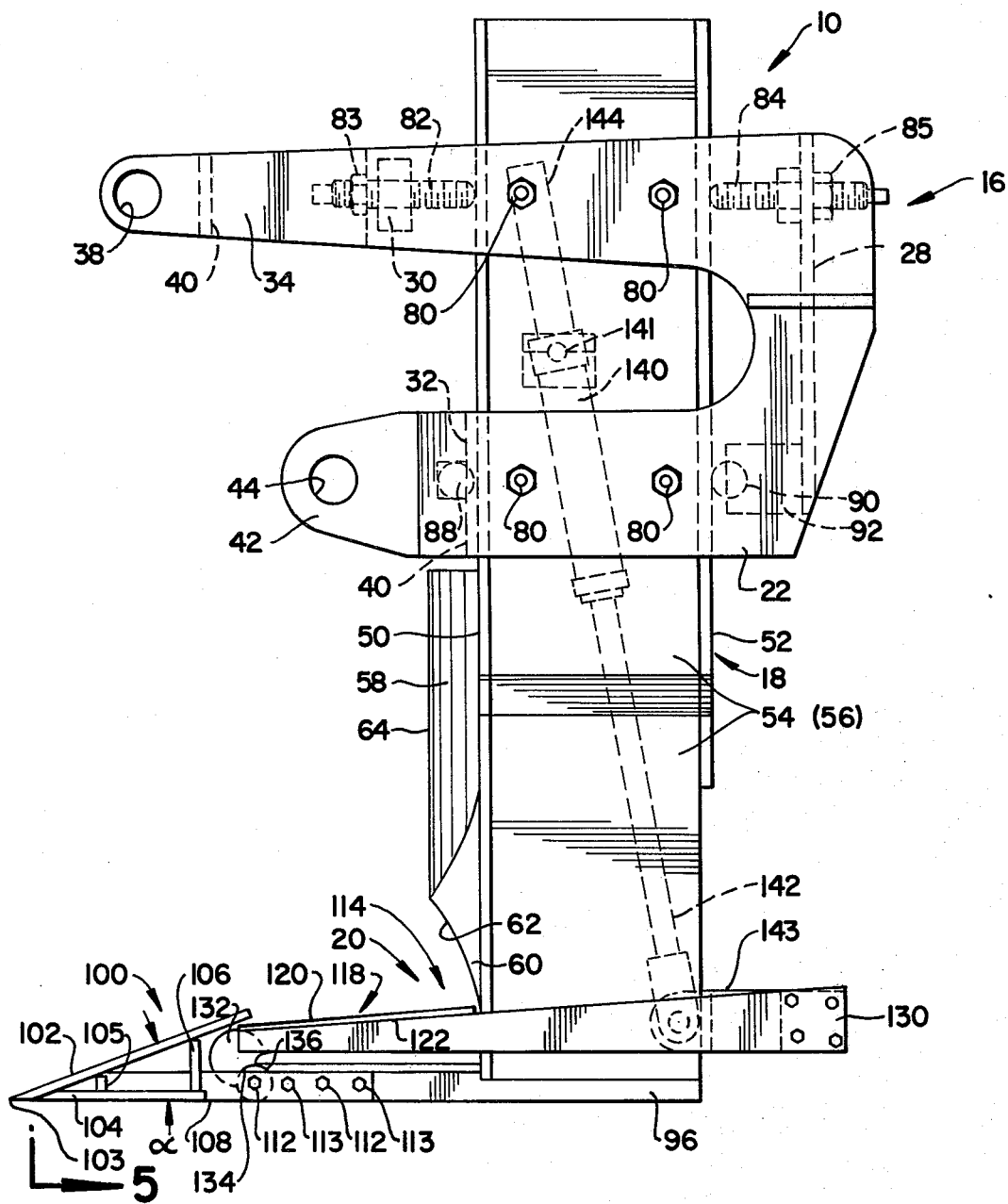

FIG. 4
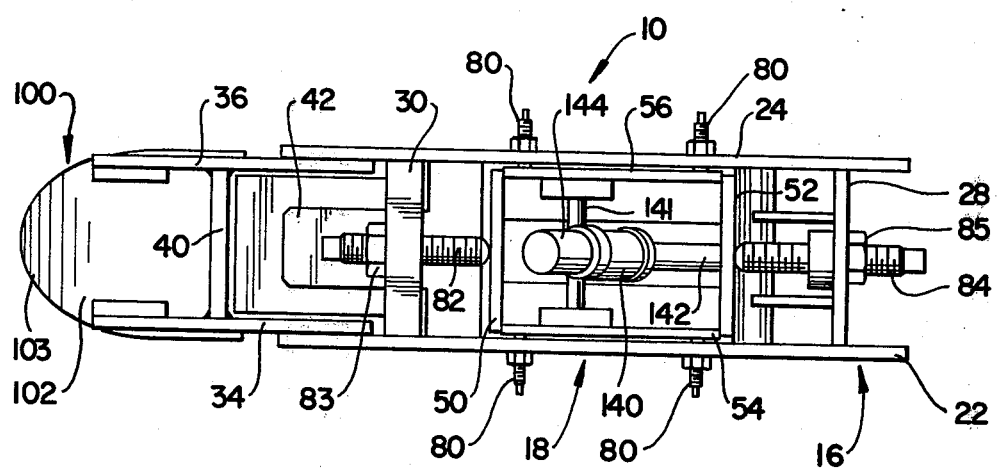
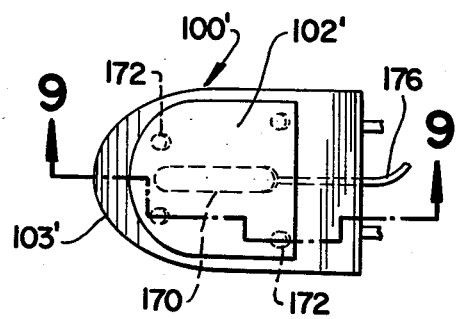
FIG. 10

DYNAMIC PLOW ASSEMBLY AND METHOD OF OPERATING SAME

BACKGROUND OF THE INVENTION

The subject invention is directed to the art of earth-working equipment and, more particularly, to a method and apparatus adapted for particular use in burying an elongated flexible member such as a plastic drainage pipe or cable a predetermined distance beneath the surface of the soil.

Typically, in the past, plow assemblies of the general type under consideration have had a narrow, rigid plow unit mounted at the lower end of a heavy support member. Through the application of great force, the plow was pulled through the soil forming a narrow, slit-like trench area into which the flexible pipe was fed at a position immediately behind the plow. The problem with this general type of plow unit was the great force required to move the plow through the soil. Additionally, the soil at the trench bottom and at the lateral sides adjacent the bottom was often heavily compacted. Thus, the naturally occurring small passages and capillaries in the soil which are necessary to permit the flow of soil water to the drain pipe were destroyed. Plow assemblies of this general type are shown, for example, in U.S. Pat. Nos. 3,425,232; 3,429,134; 3,528,255; 3,684,030; 3,699,693; and, 3,726,099.

In U.S. Pat. No. 3,706,207, issued Dec. 19, 1972, to Cornelius, et al., it was proposed to provide a plow having an oscillatory or cyclically moving front edge for the purpose of reducing the force required to move the plow through the soil and for reducing the aforementioned soil compaction problems. With the Cornelius, et al. type apparatus, however, the oscillatory or cyclical movement disclosed is harmonious and carried out through a relatively limited range. While the structure disclosed in Cornelius, et al. would probably provide some degree of improved results, the plow pulling force required and the resulting soil compression would most likely still be at undesirable levels. Moreover, Cornelius, et al. does not take other design criteria into consideration necessary to achieve the desired end results and operating parameters.

BRIEF DESCRIPTION OF THE INVENTION

The above-discussed problems and disadvantages of prior plow assemblies are overcome or greatly reduced with the apparatus and method of the subject invention. Specifically, according to one aspect of the subject invention, an apparatus of the type described is provided which includes a carrier having a vertical, downwardly-extending support member with a plow unit mounted at the lower end thereof. The plow unit includes an elongated base which extends generally horizontally with a transversely-extending inclined nose portion mounted at the forward end thereof. A plow blade top section is mounted to extend generally horizontally from the nose portion rearwardly over the base. The top section is mounted for pivotal movement about an axis extending horizontally and transverse to the base. Power means are carried within the vertically-extending support member for oscillating the blade top section at a high rate and throughout a substantial arcuate range. As used hereinafter with regard to the subject invention, oscillation refers to a cyclical type movement between defined limits wherein one oscillation or cycle of the blade top section is from an initial or first position to an extended or second position and then back to the initial or first position. The speed of movement between these positions in one cycle need not be and preferably is not the same except as between consecutive oscillations or cycles as will become more readily apparent hereinafter.

In particular, it has been found that greatly-reduced pulling force and minimal soil compaction on the lateral sides of the trench is achieved if the top section of the plow blade is continuously oscillated between a first position wherein the top surface is generally horizontal, with approximately 4 degrees of inclination being preferred, to a second position wherein it defines an angle in the range of from 15 to 30 degrees relative to the plow base or the horizontal. Preferably, the oscillation is carried out at a rate and throughout a range such that the soil above and forwardly of the plow blade is fractured completely from the plow blade to the surface. Additionally, the plow blade is arranged such that the oscillating top surface is flat and generally horizontal in planes transverse to the base. This avoids lateral compaction of the earth and tends to produce a vertical shearing action on the soil adjacent the bottom of the trench, although the oscillating top surface may also be advantageously formed to bow slightly upward. Additionally, when the oscillation is carried out at a rate and throughout a range of the type under consideration, the fracturing of the soil above and forwardly of the plow blade greatly reduces the force required to move the downwardly-extending support member through the soil since it is moving into a fractured and loosened area at all times.

In the preferred embodiment, the oscillation is carried out at a rate of from 20 to 120 cycles per minute through a range of approximately 4 degrees to an adjustable upper limit of 30 degrees relative to the horizontal. Further, in the preferred embodiment, upward movement of the plow top section from the first to the second position takes from approximately 3 to 4 times the amount of time for downward movement of the plow top section from the second back to the first position. This operative feature assists in providing smooth operation of the unit in the field and reduces draft requirements.

The inclined area of the nose portion may preferably have either a curved or straight leading edge. The curved edge configuration reduces the force required to move that edge through the soil and results in the provision of a generally curved or rounded trench bottom or bottom wall. The use of a straight leading edge results in the provision of a flat trench bottom.

The preferred embodiment also contemplates use of a pair of parallel spaced apart elongated members for defining the plow unit base. These members are positioned to extend longitudinally in the direction of plow travel and effectively reduce soil compaction at the trench bottom wall by reducing the amount of actual plow unit contact therewith.

In one alternative arrangement of the invention, a vibrator arrangement is mounted in operative communication with the inclined upper surface of the plow unit nose portion. The vibrator is of a high frequency low amplitude type and the vibrations therefrom which are imparted to the nose portion inclined upper surface aid in reducing sliding friction between the nose portion and soil.

In still another alternative, means are provided for passing a lubricant through the nose portion over the inclined upper surface thereof for reducing sliding friction.

According to another aspect of the invention, a pair of vertically extending plow support units are disposed in a spaced aligned relationship with each other and adapted to be simultaneously pulled behind a tractor type vehicle. The plow unit affixed to the trailing support unit is positioned at a greater depth than the plow unit affixed to the forward or lead support unit. Oscillation of the two plow units is controlled to allow for efficient trenching to a depth greater than that obtainable when using a single plow unit.

BRIEF DESCRIPTION OF THE DRAWINGS

The invention may take form in certain parts and arrangements of parts, a preferred and alternative embodiments of which will be described in detail in this specification and illustrated in the accompanying drawings which form a part hereof and wherein:

FIG. 1 is a side elevation showing the manner of use of a dynamic plow assembly formed in accordance with the subject invention;

FIG. 2 is an enlarged side view of the plow unit portion of the assembly shown in FIG. 1;

FIG. 3 is an enlarged side elevational view of the entire plow assembly of FIG. 1;

FIG. 4 is a top or plan view of the plow assembly of FIG. 3;

FIG. 6 is a view taken on lines 6—6 of FIG. 2;

FIG. 7 is a view taken on lines 7—7 of FIG. 2 showing the cross-sectional figuration of one runner or base forming member with the other runner or base forming member being identical thereto;

FIG. 8 is a view taken on lines 8—8 of FIG. 2;

FIG. 10 is a plan view of the vibrator arrangement shown in FIG. 9 with the cross-sectional portion of that FIG. taken through lines 9—9;

DETAILED DESCRIPTION OF THE PREFERRED EMBODIMENT

Figure 5:
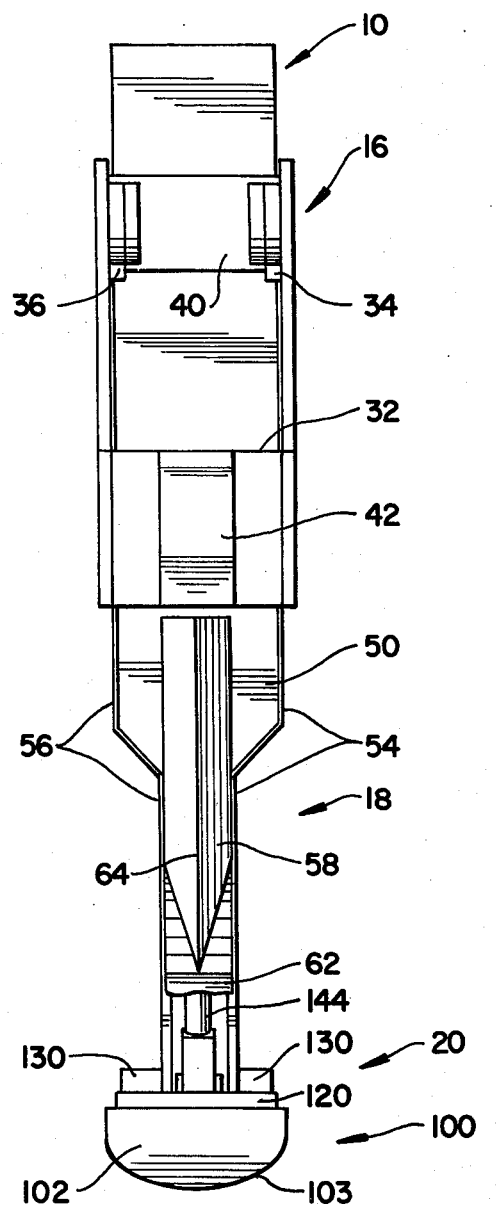
FIG. 5 is a front elevational view taken on lines 5—5 of FIG. 3.

Referring more particularly to the drawings wherein the showings are for the purpose of illustrating preferred and alternative embodiments of the invention only, and not for the purpose of limiting same, FIG. 1 shows the overall arrangement of a dynamic plow assembly 10 formed in accordance with the subject invention and being pulled in the direction of arrow a by track or crawler-type vehicle 12 for generating a narrow trench-like area having at least a positively defined bottom or bottom wall and being substantially filled by erupted soil. Thus, a temporary trench or trench-like area is formed by the plow assembly to accommodate installation of a flexible, tubular conduit or the like 14 at a predetermined distance beneath the soil surface. In the subject embodiment the conduit is installed by a separate conduit supply unit 15 towed behind plow assembly 10. As this supply unit does not form a part of the present invention, it is only schematically shown in FIG. 1 and is not described in detail herein.

As best shown in FIGS. 1 and 3, the dynamic plow assembly 10 includes a frame assembly 16 which adjustably mounts a vertical, downwardly-extending plow support unit 18. Mounted at the lower end of the support unit 18 is the dynamic plow unit 20.

As best shown in FIGS. 3 and 4, frame assembly 16 is of comparatively heavy welded plate construction and comprises a pair of similarly-shaped side plate members 22 and 24. The side frame members each have a generally U-shaped configuration and are interconnected in spaced relationship by a first transversely-extending plate member 28 which extends vertically between the bight portions of the side frames. The upper leg of each side frame 22,24 is interconnected by a relatively heavy bar member 30. Similarly, the lower legs of the side frames 22,24 are interconnected by a plate or bar 32.

To provide means for connecting frame assembly 16 to a suitable pulling vehicle, the upper legs of the side frames 22 and 24 are provided at the outer left-hand terminal end with suitable connecting plate members 34,36, each having aligned, reinforced openings 38 through which suitable connection to the vehicle can be achieved. The connecting plates 34,36 are preferably joined by a cross member 40 which extends between and is welded to each. A third connecting point or attachment to the vehicle is provided by a heavy bar portion 42 which extends outwardly from the center of cross member 32 and is provided with a transversely-formed, through opening 44.

As best shown in FIGS. 3–5, the support unit 18 is of box frame construction including a first pair of spaced plates 50,52 which are welded to side plates 54,56 which extend substantially over the entire height of the support unit. As best seen in FIGS. 3 and 5, the lower portion of the support unit 18 is substantially narrower than the upper portion. The upper portion is somewhat wider than the lower portion in the preferred embodiment here under discussion for purposes of accommodating the location of and mounting for the plow unit drive means. Thus, with alternative means and mountings, it would be possible to have the upper portion of support unit 18 be at least substantially the same width as the lower portion. This will be more readily appreciated hereinafter with regard to certain alternative arrangements shown and disclosed in some detail. Referring particularly to FIGS. 3, 5 and 6, it will be seen that an elongated generally V-shaped soil engaging member 58 is disposed to extend forwardly from and generally vertically along plate 50 from adjacent the lowermost leg of side frames 22,24 to adjacent dynamic plow 20. A dirt shield or baffle 60 is disposed at the lowermost end of soil engaging member 58 and includes a curved surface 62 curving inwardly from apex 64 of member 58 toward plate 50 for spacial cooperation with dynamic plow 20 as will be described in greater detail hereinafter.

Lateral positioning and guiding of the vertical support unit 18 to maintain it in the center between the side frames 22,24 is provided through the use of adjusting rods or screws 80 which extend inwardly through the side frames 22,24 into engagement with the side plates 54,56. Additionally, adjustment of the support unit 18 in planes parallel to the side frames 22,24 is achieved by a pair of upper screw rods 82,84. As shown, screw rod 82 passes through a threaded opening formed in the center of cross bar 30 and is locked in a position of adjustment through a nut 83. Screw rod 84 is similarly arranged and passes through the cross plate 28 into engagement with plate 52 of the vertical support unit 18. A lock nut 85 fixes rod or screw 84 in its desired position of adjustment.

The vertical support unit 18 is also maintained in alignment between the side frames 22,24 by a pair of rods 88 and 90 which are welded into openings formed in cross plate 32 and an additional cross plate 92, respectively. The rods 88 and 90 are spaced apart a distance slightly greater than the outer surfaces of plates 50 and 52 to provide bearing points for the vertical support frame 18 at a location well below the upper adjusting screws 82,84.

As is apparent from the foregoing, the inclination of the vertical plow support unit 18 can be adjusted to vary the position and location of the dynamic plow unit 20. Vertical adjustment for the plow unit for controlling the normal plowing depth can be accomplished through frame 16 and its interconnection with prime mover or vehicle 12. As such means may be many and varied and do not form a part of the present invention, they are not disclosed in detail herein. Also, in some instances, it may be desirable to include separate means for vertical adjustment between frame assembly 16 and support 18.

Of particular importance to the subject invention is the construction, arrangement and method of operating the dynamic plow unit 20. The details of construction and operation of the dynamic plow unit 20 can best be seen and understood by reference to FIGS. 2, 3 and 6. Specifically, the dynamic plow unit 20 includes a horizontally-extending base comprised by a pair of spaced, generally rectangular bar members or runners 96 and 98 which are positively joined by welding or the like to the lower end of the plow support unit 18. As shown in FIG. 7, the upper portions of these runners have a generally triangular or pyramid-like cross-sectional configuration terminating in an uppermost apex area for reasons which will become apparent hereinafter. In the preferred structure here under discussion, runners 96,98 terminate adjacent the rear of support 18 at the rear edges of plates 54,56 although in some instances, it may be desirable to extend them further rearwardly therefrom. Use of the pair of runners 96,98 for defining the plow unit base is particularly advantageous for maintaining soil compaction at the trench bottom to a minimum. Except for the forwardmost portion of the plow unit which defines a plow nose assembly, only the runners 96,98 are in engagement with the trench bottom. Thus, the amount of steel in sliding engagement with the trench bottom during plow operation is reduced to thereby reduce sealing or compaction of the soil in that area.

At the forward end or left-hand end (as viewed in FIG. 3) there is releasably connected to the bar members 96,98 a tapered plow nose assembly 100. As shown, the plow nose assembly 100 includes an inclined, flat plate 102 which is inclined at an angle alpha in the range of from 15 to 30 degrees relative to the plane defined by the base of the runners 96,98. The angle of the plate 102 is of some importance since it tends to control the amount of downwardly-directed force acting against the plow assembly to maintain it at the desired level beneath the soil surface. Further, the angle alpha is important in minimizing soil cutting force in that an angle of approximately 15–30 degrees allows the soil to be cut and lifted from the trench bottom more easily than at greater angles.

As best shown in FIGS. 5 and 6 of the preferred arrangement here under discussion, plate 102 has a curved or arcuate leading edge 103 taking a somewhat elliptical configuration. Since plate 102 is the leading portion of plow 20, the forces generated therein as it is moved through the ground will be fairly evenly distributed on leading edge 103. Further, because plate 102 is angularly disposed at an angle alpha, the net result of the soil cutting action by plate 102 is a generally round or curved bottomed trench. It will be appreciated by those skilled in the art that leading edge 103 could also be straight to form a generally square nosed plow unit. This arrangement will generate a generally flat bottomed trench when used. This modification does not in any way depart from the overall intent or scope of the present invention.

The plow nose assembly 100 further includes a horizontally extending lower member 104 and vertically-extending spacer plates 105 and 106 which are welded between plates 102 and 104. Lower member 104 has a leading edge which is compatible with the curvature of leading edge 103 of plate 102 so as not to interfere with the cutting action thereof. The nose assembly 100 is releasably connected to the base-defining runner members 96,98 by a pair of plates 108 and 110 which extend in parallel and join to the outer side surfaces of runners 96,98, respectively. Preferably, the plow nose assembly 102 is releasably connected to the runners in any convenient manner. However, in the preferred embodiment, a plurality of alternating shear pins 112 and conventional mechanical fasteners 113 are advantageously employed. The shear pins take up the major portion of the forces and the mechanical fasteners hold plates 108,110 against runners 96,98.

The upper portion of the dynamic plow unit 20 is formed by an oscillating unit 114 which includes a generally rectangular, horizontally extending plate 118. Again, and as noted above, oscillation refers to a cyclical type of movement between defined limits wherein one oscillation or cycle of the unit is from an initial or home position to an extended position and then back to the initial or home position. The speed of movement between these positions in one cycle need not be and preferably is not the same except generally as between consecutive oscillations or cycles as will hereinafter be described in greater detail. FIGS. 6 and 8 best show plate 118 as having opposed outer and inner flat surfaces 120,122 with opposed side edges 124,126 tapering inwardly from the outer toward the inner surface (FIG. 8). The reasons for such tapering will become more readily apparent hereinafter.

Further, the inner end edge 128 of plate 118 is positioned to be approximately ½ inch or less from curved surface 62 of dirt shield or baffle 60. Plate 118 itself is carried by a pair of relatively heavy, rigid bar members 130 which extend in parallel beneath inner surface 122 thereof and on opposite sides of the lower end of support unit 18. The outside faces of bar members 130 also taper inwardly from the top surfaces which support plate 118 toward the bottom surfaces (FIG. 8) for reasons which will become more readily apparent hereinafter. The left-hand ends of the bars 130 as viewed in FIG. 3 are joined by a generally crescent-shaped bar member 132. An arcuate recess 134 is formed in the bar 132 and engages a transversely-extending rod or bar 136 connected between the left-hand end of the runners 96,98. This arrangement permits the oscillating unit 114 to have its oscillatory or pivotal movement about a transverse axis defined by the bar 136 at a point closely adjacent the nose assembly 100.

As discussed previously, an important aspect of the subject invention is the amount of oscillatory motion imparted to unit 114. This motion is preferably carried out at a rate and through an arcuate range such that the earth above and forwardly of the plow assembly is ruptured entirely to the surface. To achieve this, it has been found that the unit 114 should be oscillated at a rate of something in the range of from 20 to 120 cycles per minute throughout an angular range of from substantially horizontal or approximately 4 degrees as shown in the solid lines to an adjustable upper point or position of from 15 to 30 degrees relative to the horizontal as shown by the dotted lines of FIG. 2.

The particular rate of oscillation frequency employed for a specific trenching operation will depend to some extent on the ground speed of the plow unit, i.e., the speed at which the unit is moved through the soil. For example, an oscillation frequency of 20–40 cycles per minute would be used at a plow unit ground speed of approximately 30–50 feet per minute and at an oscillation frequency of 60–120 cycles per minute for a ground speed of approximately 80–120 feet per minute. More particularly, actual field testing of the subject preferred embodiment has shown that the oscillation frequency of unit 114 should be commensurate with the forward ground speed at which the plow structure is pulled by tractor or vehicle 12. In other words and in order to achieve the most acceptable operational results, oscillation unit 114 must make at least one complete oscillation or cycle for each increment of plow forward movement equal to the length of plate 118 as measured from the rear of plow nose assembly 100 to the forward edge of plow support unit 18. Further, the second or upper position of oscillation for unit 114 in the range of 15–30 degrees relative to the base will preferably depend upon the depth of the plowing or trenching operation. For example, an upper limit of approximately 15 degrees would be used at shallow plowing of around 30 inches or so and an upper limit of approximately 30 degrees would be used for deeper operations as at 6 feet or so. Control of the upper limit of oscillation is provided by means described hereinafter.

Although a variety of different power means could be used for providing the desired oscillation, the subject embodiment utilizes a heavy duty, fast-acting hydraulic cylinder 140 of known construction which is pivotally mounted from a pair of trunnions 141 carried by the side plates 54,56 in the upper portion of support unit 18. The lower end 142 of the cylinder rod extends downwardly within the frame of support unit 18 to engagement with a connecting block 143 bolted between the bars 130. In the preferred arrangement, the upper end 144 of the cylinder rod has a larger diameter than lower end 142 to insure that the down or return stroke of oscillating unit 114 will be at the desired faster rate of speed than the up or power stroke. This is accomplished by delivering the same quantity of oil in gallons per minute to the cylinder during both the up and down strokes thereof. The displacement of the cylinder rod is a function of the volume or cross-sectional area of that side of cylinder 140 which receives oil. Because of the difference in diameter between cylinder rod lower and upper ends 142,144, a larger cross-section of the piston is exposed to oil during the upward stroke than is the case during the downward stroke. Therefore, the same inflow of oil into the cylinder at opposite sides of the piston will result in the provision of much faster cylinder movement during the downstroke.

It has been found preferable for obtaining the most advantageous operational results to have the power stroke of cylinder 140, i.e., the stroke which moves plate 118 of oscillating unit 114 from the home or first position as shown in solid lines in FIG. 2 to the up or second position shown in dashed lines in that same FIGURE, comprise in the range of approximately 3 to 4 times the amount of time required to move plate 118 from the second back to the first position. This operational characteristic may be easily achieved when using the above discussed construction for hydraulic cylinder 140 through the use of mathematical calculations for determining the relative diameters of cylinder rod lower and upper ends 142,144.

The hydraulic circuitry to achieve the above described operation is also of a known type (not shown). It should be appreciated that it may require a four-way solenoid actuated valve, a pressure tank and appropriate check valves to achieve the desired fast cylinder return. As the specifics of the hydraulic system itself do not themselves form a part of the present invention, they have not been shown or otherwise further described herein. It should be noted further that the soil itself will tend to assist in forcing the oscillating unit downward to the initial or first position as the plow assembly is advanced through ground. Therefore, it is important that the hydraulic circuitry allow for fast return and not in any way impede such return. To this end, the lower end of cylinder 140 is provided with extra hydraulic hose capacity for dumping oil in that end into a tank during the oscillating unit return stroke. Also, when the soil causes unit 114 to be forced downwardly at a higher rate of speed than oil is normally pumped into the cylinder upper end, a condition known in the hydraulics art as cavitation can occur where oil is under suction rather than pressure. To avoid this condition, the hydraulic system is designed so that extra oil can be sucked from the tank as well as being supplied by the pump. For controlling the upper angular limit of oscillation between the preferred range of 15–30 degrees, adjustable limit switches may be conveniently mounted adjacent hydraulic cylinder 140 in operative communication with one of cylinder rod lower and upper ends 142,144. These switches are wired to the hydraulic circuitry in a manner so that energization thereof controls the upstroke of cylinder 140. Many other types of controls or arrangements for achieving the same results could also be employed, however.

Again, the structure for hydraulic cylinder 140 as well as the hydraulic circuitry are known. As the particulars thereof do not form a specific part of the present invention, they are not shown and described in any great detail herein. It will be appreciated by those skilled in the art that alternative means could also be advantageously employed for obtaining the desired oscillation for oscillating unit 114 without in any way departing from the overall intent or scope of the present invention.

The unequal division of the cycle time between the power and return strokes of cylinder 140 facilitates steady and continuous movement of the dynamic plow assembly 10 through the soil. That is, the track or crawler type vehicle pulling the plow is thereby allowed to continuously advance along a desired path when the plow is in operation. During the power stroke of each consecutive cycle, new soil just ahead of the plow is being disrupted. If the return stroke is too slow, the tractor will advance the plow to a position where it is engaging non-disrupted soil so that it is merely functioning as a conventional plow arrangement. In this situation, progress of the plow assembly through the soil would comprise a jerky stop and go type of motion which can cause structural fatigue in the plow assembly as well as operational problems with both the plow and tractor. As hereinabove noted, operation of the plow unit so that oscillation unit 114 makes at least one oscillation cycle for each increment of plow forward movement equal to the length of plate 118 provides low draft and smooth plow performance.

The dynamic plow assembly 10 is connected at connecting plate members 34,36 and at bar portion 42 to a track or crawler type vehicle by means of a boom or yoke generally designated 150 in FIG. 1. The particulars of this boom or yoke do not form a part of the present invention and are not, therefore, specifically described in greater detail herein.

As the plow assembly is moved through the soil in the manner generally shown in FIG. 1, tapered nose plow assembly 100 engages the soil and, through the action of leading edge 103 of plate 102, causes a round or curved bottomed configuration in the channel or trench being dug. Oscillating unit 114 is operated within the preferred range of 20 to 120 oscillations per minute so that on each upward stroke of the unit, the soil thereabove to ground level is fractured or erupted into a loosened mass. Because of this action, some of the loosened soil will have a tendency to fall toward the bottom of the trench and into the inner workings of unit 114. To prevent the oscillating unit from clogging after some period of usage, certain structural safeguards have been incorporated into the overall dynamic plow structure.

First, the close spaced relationship between edge 128 of plate 118 and curved surface 62 of baffle 60 substantially prevents loose dirt from passing behind plate 118 at edge 128 into the inner workings of the unit. In this context, it will be appreciated that the radius of curvature of the baffle is only approximately ½ inch greater than the radius of curvature of the arc generated by edge 128 during cyclical movement of plate 118.

Second, the slight tapering of plate 118 side edges 124,126 and the sides of bars 130 in the manner described in detail above provides side relief for the plate to assist in preventing the plate from scraping or dislodging additional soil during the return stroke of the plate. Thus, the soil is substantially dislodged and erupted by the wedging action of plate 118 and arms 130 during upward movement thereof in each cycle or oscillation.

Another safeguard here is the pyramid configuration of the upper portion of runners 96,98. Any soil falling onto the pyramid runner configurations during apparatus operation will be split off therefrom during each cycle of the oscillation unit. This feature eliminates soil collection and subsequent compaction at the runner top surface which could otherwise disrupt efficient plow operation.

During plow assembly movement through the soil in direction a (FIG. 1), the area of support unit 18 is disposed between ground level and dynamic plow 20 will be drawn through already erupted soil. However, and in order to avoid soil compaction by and at that area of the plow assembly, V-shaped soil engaging member 58 is advantageously provided. This structure causes the already erupted mass of soil to be split at apex 64 and be funneled along the diverging sides of the member to eliminate compaction and balling in a wide variety of soil types and conditions.

With the unit formed and operated in the manner described above, a trench having a depth of approximately 4 feet can be made by use of a tractor capable of exerting a drawbar pull in the range of approximately 10,000 to 20,000 lbs. The width of the trench at the bottom is a function of the width of dynamic plow unit 20. Typically, however, this width will be around 12 inches or so. It is possible to obtain movement of the plow assembly through the ground at a speed in the range of approximately 30 to 125 feet per minute, depending upon the depth of plowing and grade and depth control operations. The various speeds and operational characteristics as just outlined may be altered as deemed necessary and/or appropriate within the preferred ranges. Such alterations are dependent upon variances in the operational characteristics themselves as well as variations in soil make-up. Still further, the operational characteristics of the plow assembly may be improved somewhat by reducing the soil engaging friction between the assembly and the soil during assembly operation. This may be accomplished by constructing certain of the components which are directly involved in the trenching action from stainless steel or by coating them with Teflon or the like.

Figure 9:
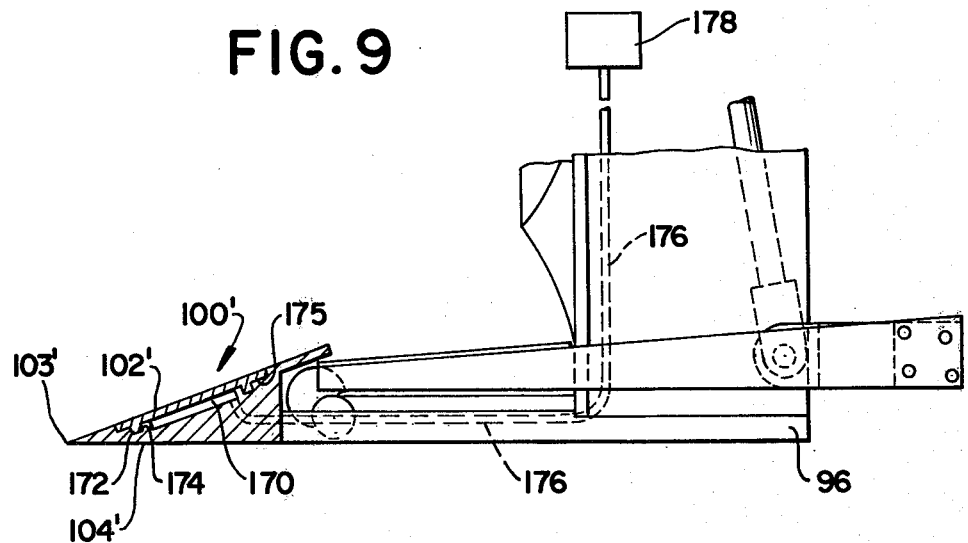
FIG. 9 is a view similar to FIG. 2 in partial cross-section schematically showing a vibrator arrangement mounted in the dynamic plow unit nose portion.

FIGS. 9 and 10 show a slight modification for the basic plow nose assembly. For ease of illustration and appreciation of the invention, like components are identified by like numerals with a primed (') suffix and new components are identified by new numerals. In this alternative embodiment, a vibrator unit schematically designated by numeral 170 is conveniently operably mounted in nose assembly 100' to flat upper plate 102' for causing vibration thereof. Here, leading edge 103' of the nose assembly comprises an integral part of the main support frame for the nose. Plate 102' includes a plurality of shaft-like posts 172 extending outwardly from the bottom surface thereof and which are received in openings 174 included in the plow nose assembly main frame. Posts 172 act to resist the shear force of soil sliding over the nose. Plate 102' is advantageously insulated from the remainder of nose assembly 100' by means of a urethane rubber shock absorbing mounting 175. The urethane mounting completely encapsulates posts 172 and provides insulation between plate 102' and the base of leading edge 103'. Vibrating unit 170 preferably has a torpedo-like configuration with a length of approximately 10 inches. Unit 170 is rigidly affixed by convenient means (not shown) to the underside of plate 102' with none of the insulation material being included at that area. Further, there is no restraining mount or surface in the nose for plate 102'. The preferred design simply provides a cavity in the nose for receiving vibrating unit 170 and urethane rubber shock absorbing mounting 175 isolates the vibrating portion of the nose to reduce the normal stresses that would otherwise occur in the bolted joints, welds and so on in the main plow frame. Other vibrator mounting and nose configurations could also be used in practicing the overall concepts of the present invention.

Vibrator unit 170 is preferably of the hydraulic type and conveniently connected by line 176 to controls 178. The controls may be advantageously mounted in the track or crawler type vehicle itself to permit selective vibrator adjustment within a preferred range. Many types and styles of vibrators could be used, however, a vibrator having frequency capabilities in the range of 25 to 150 cycles per second and amplitude capabilities of approximately 1/16 inch is preferred. The effect of vibrating upper plate 102' of nose assembly 100' is to reduce its sliding friction against the soil. This, in turn, allows for a reduction in the drawbar pull necessary to effectively move the plow assembly through the ground.

Figure 11:
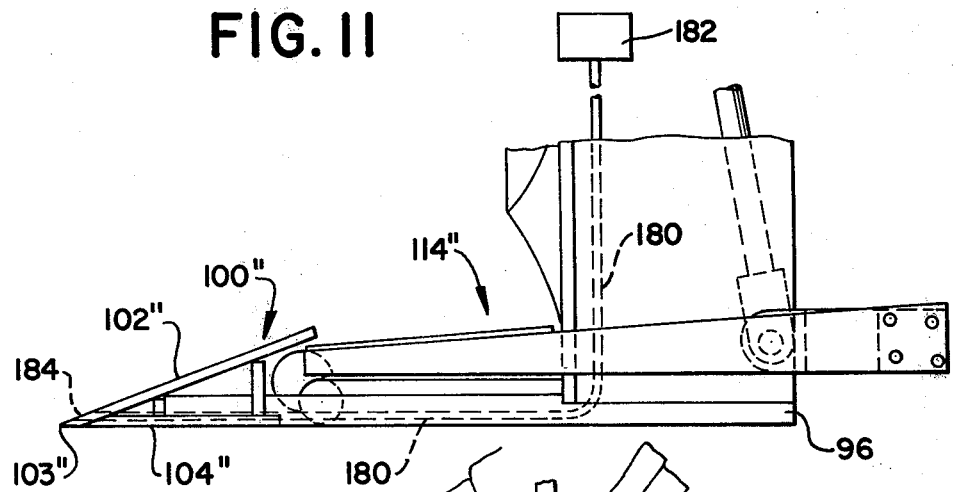
FIG. 11 is a view similar to FIG. 2 generally schematically showing a lubricating arrangement for the dynamic plow unit nose portion.

A still further modification is shown in FIG. 11. Here, like components are identified by like numerals with a double primed (") suffix and new components are again identified by new numerals. In FIG. 11, a lubricant line 180 passes down through the plow support unit from a pump schematically shown and designated 182, through the inside of oscillating unit 114" to nose assembly 100". The line then passes to the underside of plate 102" and communicates with the outer surface thereof by means of at least one orifice 184 disposed adjacent leading edge 103". This arrangement allows an appropriate lubricant to be continuously or intermittently supplied to the outer face of plate 102" for reducing soil sliding friction. If desired, the lubricant may be conveniently supplied to the plate outer face by a plurality of orifices. The linear movement of the plow assembly through the ground causes the lubricant to be carried from leading edge 103" back over the surface of plate 102".

With reference to the somewhat schematic showings of FIGS. 12-14, description will hereinafter be made to an arrangement which utilizes a pair of coordinated dynamic plow assemblies. Except where otherwise specifically noted, the specifies of construction and operation of each assembly are substantially identical to that discussed above in detail with reference to FIGS. 1-8. Use of dual or tandem plow assemblies make it possible to efficiently dig deeper trenches, i.e., in the approximate range of 6 to 7½ feet.

Figure 12:
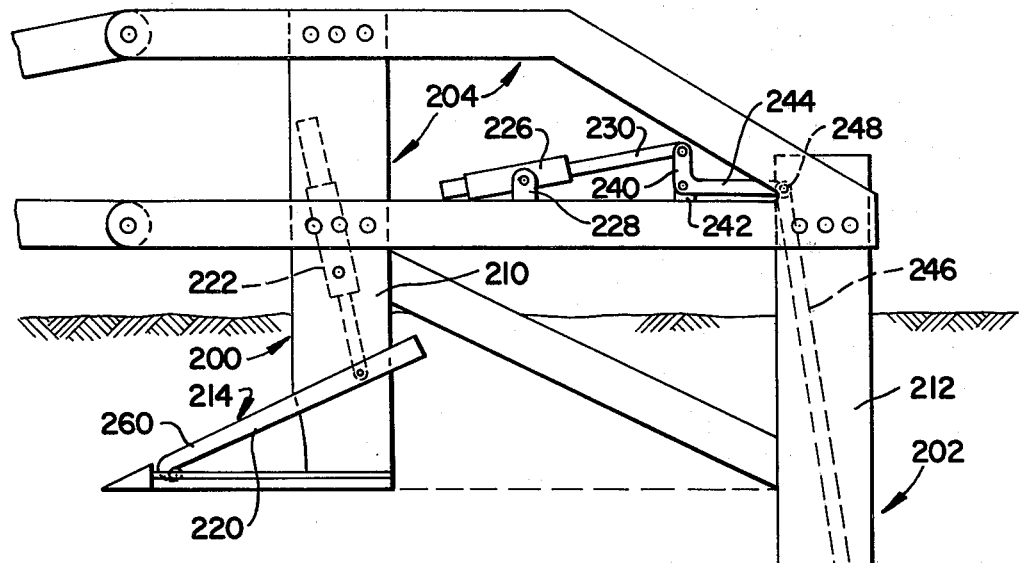
FIG. 12 is a side elevation of a pair of dynamic plows incorporating the concepts of the subject invention and which are mounted in tandem to facilitate trenching operations at greater depths.

In FIG. 12, the front and rear plow assemblies 200,202 are conveniently affixed so as to extend downwardly from a boom 204 which is connected to the track or crawler type vehicle (not shown). The plow support 210 of front assembly 200 extends downwardly a lesser distance than the plow support 212 of rear assembly 202 so that the dynamic plows 214,216 associated therewith will operate at different depths, that is, the trailing plow unit will plow at a greater depth than the leading plow unit.

The oscillating unit 220 associated with the front assembly 200 is oscillated by means of a hydraulic cylinder 222 in much the same manner as described hereinabove with reference to oscillating unit 114 and cylinder 140 in FIGS. 1-8. The oscillating unit 224 associated with rear assembly 202 is oscillated by a slightly different hydraulic cylinder arrangement. Here, cylinder 226 is pivotally mounted to a clevis 228 which is affixed to boom 204. The outer end of cylinder rod 230 is pivotally affixed to the shorter leg 240 of a generally L-shaped mechanical link adjacent the end thereof. The link itself is pivotally mounted to a mounting bracket 242 at generally the intersection of shorter link leg 240 and the longer link leg 244. An elongated drive rod 246 has one end 248 pivotally affixed to leg 244 adjacent the end thereof and the other end 250 pivotally affixed to oscillating unit 224. The mounting arrangement for cylinder 226 could also be advantageously employed with the embodiment discussed above with reference to FIGS. 1-8. In that event, the upper and lower portions of support unit 18 therein shown may be of the same general width since they would only have to accommodate the elongated drive rod.

The mechanical linkage arrangement described provides a mechanical disadvantage on cylinder 226 because of the differences in lengths of legs 240,244. This feature is employed since it is often easier to produce force rather than speed with a hydraulic cylinder. Thus, the mechanical disadvantage shown facilitates greater lift speed capabilities with the larger hydraulic pressures available.

Still further, it is contemplated that oscillating plate 260 in unit 220 will have a width greater than the width of oscillating plate 262 in unit 224. In the preferred arrangement contemplated, plate 260 is approximately 18 inches wide and plate 262 is approximately 10 inches wide. The reasons for this difference in width will be described hereinafter and it will be appreciated that other ranges of width differences could also be advantageously employed without departing from the overall intent or scope of the invention. Plate 260 may also be slightly upwardly curved or bowed when viewed in cross-section for increasing the width of that soil erupted during plow assembly operation, i.e., for increasing the width of the trench-like area itself.

Figure 13:
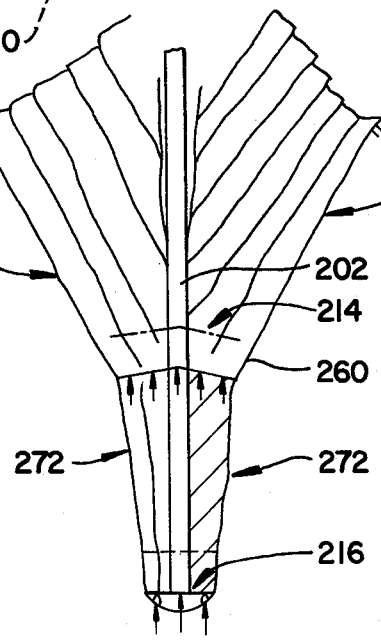
FIG. 13 is a generally schematic rear cross-sectional view of the path of travel through the soil of the tandem arrangement shown in FIG. 12; and, FIG. 14 is a side elevation of a modified tandem plow arrangement which facilitates alternate grade control capabilities.

In operation, and with reference to FIG. 13, the leading or front assembly 200 erupts the undisturbed soil from the plow portion thereof to ground level for forming a wedge of loose soil between the planes of shear. The following or rear assembly 202 erupts the undisturbed soil upwardly to the loose soil wedge of the leading assembly 200 or, in some soil conditions, into a temporary cavity left by the leading plow assembly. As will be seen in FIG. 13, the narrower width of dynamic plow 216 decreases the draft of the resultant erupted soil. FIG. 13 also schematically shows a slightly bowed configuration for plate 260 as discussed above. Moreover, the planes of shear for assembly 200 are designated by numerals 270 and the planes of shear for assembly 202 are designated by numeral 272.

Oscillating units 220,224 of dynamic plows 214,216 respectively, are preferably set so as to generally operate 180° out-of-phase from each other, at least at the ends of their respective half cycles. That is, when the oscillating unit of one of the plows is at the top end of the upstroke, the oscillating unit of the other plow is at the bottom end of the downstroke. As with and similar to the embodiment of the invention shown and described above with reference to FIGS. 1-8, oscillating units 220,224 operate in a manner such that each upstroke of the units occurs at a slower rate than the downstroke, i.e., the upstroke portion of each cycle takes a greater amount of the predetermined cycle time than the corresponding downstroke.

Figure 14:
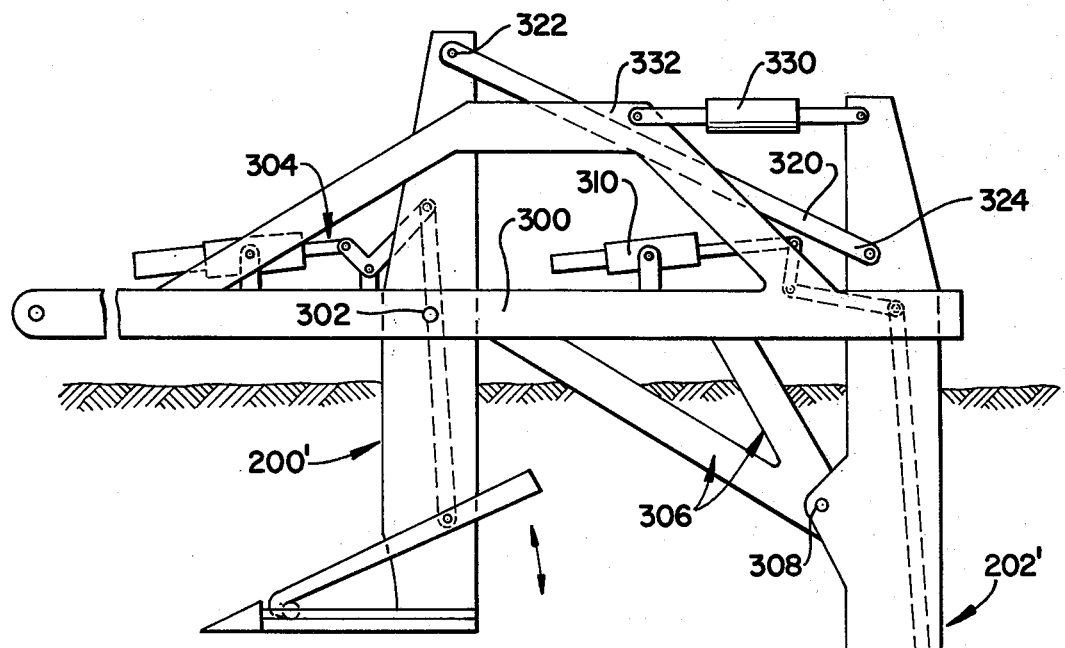

A still further modification for the tandem plow arrangement is shown in FIG. 14. Like components are identified by like numerals with a primed (') suffix and new components are identified by new numerals. Here, the boom used to mount the plow assemblies to the pulling vehicle includes means for adjusting plow assemblies 200′,202′ to allow for specific grade control. To that end, the boom includes an elongated main portion 300 with front plow assembly 200′ pivotally connected thereto as at pivot mounting 302 so that a portion of the assembly extends above the boom. An oscillating unit drive cylinder and linkage arrangement 304 is provided in a manner similar to the arrangement shown and described with reference to FIG. 12.

A lower boom portion 306 comprised of a pair of converging members includes a pivot mounting area 308 for mounting plow assembly 202′ thereto so that a portion of the assembly extends above main boom portion 300. An oscillating unit drive cylinder and linkage arrangement 310 is provided which is also similar to the arrangement shown and described with reference to FIG. 12.

A parallelogram link 320 is pivotally affixed at one end 322 adjacent the uppermost end of assembly 200′ and at the other end 324 to assembly 202′ intermediate the uppermost end and pivot mounting 308. The spacial relationships of the pivotal mountings for the plow assemblies and parallelogram link are such that pivotal movement of one assembly causes a corresponding pivotal movement in the other assembly.

To facilitate grade control for the tandem plows, a grade control hydraulic cylinder 330 is operably connected between an upper boom portion 332 and the uppermost end of plow assembly 202′. Extension and contraction of this cylinder by conventional control means (not shown) thereby allows for some swinging of the plow assemblies in unison to compensate for grade changes in the ground being trenched. Operation of the remainder of the FIG. 14 tandem unit is substantially as described hereinabove.

It will be readily appreciated by those skilled in the art that the alternative arrangements disclosed with reference to FIGS. 9–14 could be variously and advantageously combined with each other or incorporated into the preferred arrangement disclosed with reference to FIGS. 1–8. Such modifications are not deemed to in any way depart from the overall intent or scope of the invention.

The invention has been described with reference to the preferred and alternative embodiments. Obviously, modifications and alterations will occur to others upon the reading and understanding of this specification. It is intended that all such modifications and alterations will be included insofar as they come within the scope of the appended claims or the equivalents thereof.

Having thus described our invention, we now claim:

1. A method of generating a trench-like area in the soil comprising the steps of:
   (a) providing a first plow member having a base, a tapered forward nose portion, and a top section extending rearwardly from said nose portion over said base;
   (b) positioning said first plow member at a predetermined distance beneath the surface of the soil with its base extending generally horizontally;
   (c) moving said plow member through the soil in the direction of its nose portion;
   (d) oscillating said top section and rupturing the soil above said plow member by pivotally moving said top section up and down in a generally vertical plane at a rate in the range of 20 to 120 cycles per minute simultaneously with said step of moving said plow member through the soil; and
   (e) each said cycle being from a first position in which said top section extends generally parallel to said base then upwardly through an angle in the range of 15 to 30 degrees to a second position and then back to said first position.

2. The method as defined in claim 1 wherein said top section moves through at least one said cycle for each increment of movement of said plow member equal to the length of said top section as measured rearwardly from said nose portion.

3. The method as defined in claim 1 wherein said top section is moved from said first to said second position at a slower rate of speed than from said second back to said first position.

4. The method as defined in claim 3 wherein said top section is pivotally moved such that movement thereof from said first to said second position takes approximately 3 to 4 times as long as for movement from said second back to said first position.

5. The method as defined in claim 1 further including the step of vibrating at least a portion of said nose portion for reducing sliding friction between said nose portion and the soil.

6. The method as defined in claim 5 wherein said step of vibrating comprises vibrating said nose portion at high frequency and low amplitude.

7. The method as defined in claim 6 wherein said high frequency is in the range of 25 to 150 cycles per second and said low amplitude is approximately 1/16 inch.

8. The method as defined in claim 1 further including the step of supplying a lubricant to said nose portion for reducing sliding friction between said nose portion and the soil.

9. The method as defined in claim 1 further including the steps of: providing a second plow member substantially similar to said first plow member; locating said first and second plow members relative to each other such that said second plow member is spaced apart from and behind said first plow member in a manner such that said plow members define a generally vertical plane; positioning said second plow member at a predetermined distance beneath the earth greater than the distance of said first plow member; and, applying a force simultaneously to said first and second plow members in the direction of their nose portions while simultaneously oscillating their respective top sections.

10. The method as defined in claim 9 wherein said step of simultaneously oscillating the top sections of said first and second plow members includes coordinating the oscillations thereof to be approximately 180 degrees out of oscillating phase with each other at least during a portion of the simultaneous oscillations thereof so that the top section of one of said plow members is in said second position when the top section of the other of said plow members is in said first position.

11. The method as defined in claim 1 further including the step of providing force means for selectively positioning said first plow member so that the base member thereof is angled from a generally horizontal disposition for facilitating grade control in the soil.

12. Apparatus for generating a trench-like area in the soil comprising:
   a first generally vertically-extending support member;
   a first plow unit carried at the lower end of said support member, said first plow unit including an elongated base extending generally horizontally with a transversely-extending nose portion mounted at one end thereof, the nose portion including a top surface which is inclined upwardly relative to said base, a plow blade top section extending rearwardly and generally horizontally from said nose portion over said base, means pivotally connecting said top section to said base for oscillatory movement about a transverse axis; and, power means for oscillating said top section about said transverse axis through repetitive cycles with each cycle moving said top section from its generally horizontal position to a second position wherein it defines an included angle in the range of 15 to 30 degrees relative to said base and then back to its generally horizontal position.

13. The apparatus as defined in claim 12 wherein said top surface of said nose portion is inclined upwardly relative to said base at an angle in the range of 15 to 30 degrees.

14. The apparatus as defined in claim 12 wherein said power means comprises a hydraulic cylinder connected to said top section through an intermediate mechanical linkage for placing a mechanical disadvantage on said cylinder during movement of said top section from its generally horizontal to its second position.

15. The apparatus as defined in claim 12 wherein said power means is adapted to oscillate said top section in the range of approximately 20 to 120 cycles per minute.

16. The apparatus as defined in claim 12 further including means for separately vibrating at least a portion of said nose portion at high frequency and low amplitude for reducing sliding friction between said nose portion and the soil.

17. The apparatus as defined in claim 16 wherein said vibrating means includes means for selectively adjusting the vibrations thereof between a range of 25 to 150 cycles per second and at an amplitude of approximately 1/16 inch.

18. The apparatus as defined in claim 12 including means for supplying a lubricant to said nose portion for reducing sliding friction between said nose portion and the soil.

19. The apparatus as defined in claim 12 wherein said power means is adapted to control oscillation of said top section so that the speed of movement thereof from said generally horizontal position to said second position is slower than from said second position back to said generally horizontal position.

20. The apparatus as defined in claim 19 wherein said power means facilitates adjustment of said top section oscillating speed such that the time of movement thereof from said generally horizontal to said second position takes in the range of approximately 3 to 4 times the amount of time for movement from said second back to said generally horizontal position.

21. The apparatus as defined in claim 20 wherein said power means is adapted to oscillate said top section at a rate in the range of 20 to 120 cycles per minute.

22. The apparatus as defined in claim 12 wherein at least a portion of said top section is bowed outwardly relative to said base across the transverse dimension thereof.

23. The apparatus as defined in claim 12 further including means for selectively positioning at least said first plow unit so that said base member is angled from a generally horizontal disposition to facilitate grade control in the soil.

24. The apparatus as defined in claim 12 wherein said base is defined by a pair of spaced apart elongated runners for reducing soil compaction between said plow unit and the soil.

25. The apparatus as defined in claim 24 wherein said runners include upper surfaces which are inclined upwardly in the transverse directions thereof.

26. The apparatus as defined in claim 25 wherein said upper surfaces include an apex area extending longitudinally of said runners to prevent the accumulation of soil thereat during apparatus operation.

27. The apparatus as defined in claim 12 further including a second support member and a second plow unit generally identical to said first support member and said first plow unit, said first and second members and units being operably interconnected and disposed in line with each other so that said first and second plow units extend outwardly in the same direction from their respective support members, said second support member having a greater length than said first support member such that said second plow unit is disposed at a lower elevation than said first plow unit, and power means for simultaneously oscillating the top sections of both said first and second plow units.

28. The apparatus as defined in claim 27 including separate power means for each of said first and second plow units for oscillating their respective plow unit top sections at a rate of from approximately 20 to 120 cycles per minute.

29. The apparatus as defined in claim 27 further including means for coordinating the oscillations of the first and second plow unit top sections to be 180 degrees out of oscillating phase with each other at least during a portion of the simultaneous oscillation thereof in a manner such that the top section of one of said plow units is in said second position when the top section of the other of said plow units is in said first position.

30. The apparatus as defined in claim 27 wherein the oscillating top section associated with said first plow unit has a greater width dimension than the oscillating top section associated with said second plow unit.

31. The apparatus as defined in claim 30 wherein at least a portion of at least the top section associated with said first plow unit is bowed outwardly relative to its base across the width dimension thereof.

32. In apparatus for generating a trench-like area in the soil and which apparatus includes a plow unit having a top section cyclically movable between a first normal position and a second position inclined upwardly from the first position for erupting soil through which said plow unit is passed, the improvement comprising:

power means for moving said top section from said first to said second position at a slower rate of speed than movement from said second back to said first position, and wherein said plow unit includes an elongated base, said base being comprised of a pair of spaced apart elongated runners for reducing soil compaction between said plow unit and the soil, said runners having upper surfaces including an apex area extending longitudinally of said runners to prevent the accumulation of soil thereat during apparatus operation.

33. The improvement as defined in claim 32 wherein said power means is adapted to facilitate adjustment of said top section speed such that movement from said first to said second position comprises in the range of 3 to 4 times the amount of time required for movement from said second back to said first position.

34. The improvement as defined in claim 33 wherein said power means is adapted to cycle said top section at a rate of approximately 20 to 120 cycles per minute.

35. In a plow type apparatus for generating a trench-like area in the soil and which apparatus includes a nose portion at the lead end thereof having a top surface which is inclined upwardly from a leading edge and a plow blade top section extending rearwardly from said nose portion and wherein at least a portion of said top section is cyclically movable from a first normal position to a second position inclined upwardly from said first position for erupting soil through which said plow type apparatus is passed, the improvement comprising:

means for vibrating said nose portion at high frequency and low amplitude and power means for moving said top section from said first to said second position at a slower rate of speed than movement thereof from said second back to said first position during each top section cycle.

36. The improvement as defined in claim 35 wherein said vibrating means is adapted to vibrate said nose portion in the range of 25 to 150 cycles per second and said power means is adapted to facilitate adjustment of said top section speed such that movement from said first to said second position takes in the range of 3 to 4 times as long as movement from said second back to said first position.

37. The improvement as defined in claim 36 wherein said power means is adapted to cycle said top section in the range of 20 to 120 cycles per minute.

38. A method of generating trench-like area in the soil comprising the steps of:
(a) providing a plow member having a base, a tapered forward nose portion, and a top section extending rearwardly from said nose portion over said base;
(b) positioning said plow member at a predetermined distance beneath the surface of the soil with its base extending generally horizontally;
(c) applying a force to said plow member to move it through the soil in the direction of its nose portion;
(d) continuously oscillating said top section at least during said step of applying at a rate in the range of 20 to 120 cycles per minute in a generally vertical plane about an axis between a first position wherein said top section lies generally parallel to said base and a second position wherein it makes an angle in the range of 15 to 30 degrees relative to said base for producing a rupturing of the soil above the plow member and an opening behind the plow member into which the elongated member can be placed; and,
(e) controlling the speed of movement of said top section during said step of oscillating such that movement thereof from said first position to said second position takes approximately 3 to 4 times as long as for movement from said second back to said first position.

39. The method as defined in claim 38 further including the step of vibrating said nose portion at approximately 25 to 150 cycles per second and at low amplitude at least during said steps of applying and oscillating.

40. The method as defined in claim 38 wherein said step of oscillating is performed at least once during said step of applying for each increment of movement of said plow member equal to the length of said top section as measured rearwardly from said nose portion.

41. Apparatus for generating a trench-like area in the soil comprising:

a generally vertically-extending support member;

a plow unit carried at the lower end of said support member, said plow unit including an elongated base extending generally horizontally with a transversely-extending nose portion mounted at the forward end thereof, said nose portion including a top surface which is inclined upwardly at an angle in the range of 15 to 30 degrees relative to said base, a plow blade top section extending rearwardly and generally horizontally from said nose portion over said base, and means pivotally connecting said top section to said base for oscillatory movement about a transverse axis adjacent said nose portion;

power means for oscillating said top section about said transverse axis at a rate in the range of 20 to 120 cycles per minute between its generally horizontal position and a second position wherein it defines an included angle in the range of 15 to 30 degrees relative to said base; and, vibrating means for vibrating said nose portion at a rate in the range of 25 to 150 cycles per second and at low amplitude.

42. The apparatus as defined in claim 41 wherein said power means is adapted to move said top section from said generally horizontal to said second position at a slower rate of speed than from said second back to said generally horizontal position.

* * * * *